(12) United States Patent
Togashi

(10) Patent No.: US 7,251,115 B2
(45) Date of Patent: Jul. 31, 2007

(54) MULTILAYER CAPACITOR

(75) Inventor: Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/366,754

(22) Filed: Mar. 3, 2006

(65) Prior Publication Data

US 2006/0209492 A1    Sep. 21, 2006

(30) Foreign Application Priority Data

Mar. 18, 2005  (JP)  ............................ P2005-080247

(51) Int. Cl.
*H01G 4/005* (2006.01)
*H01G 4/228* (2006.01)
(52) U.S. Cl. .................... 361/303; 361/306.3; 361/329
(58) Field of Classification Search ........ 361/303–305, 361/306.1, 306.3, 309, 311, 328, 329
See application file for complete search history.

(56) References Cited

U.S. PATENT DOCUMENTS 6,515,842 B1 * 2/2003 Hayworth et al. .......... 361/303
6,906,910 B1 * 6/2005 Gilliland et al. ............ 361/328
7,092,236 B2 * 8/2006 Lee et al. ................... 361/311

FOREIGN PATENT DOCUMENTS

JP        A 07-142285        6/1995

* cited by examiner

*Primary Examiner*—Eric Thomas
(74) *Attorney, Agent, or Firm*—Oliff & Berridge, PLC

(57) ABSTRACT

A multilayer capacitor includes a multilayer body in which a plurality of dielectric layers and a plurality of internal electrodes are alternately laminated, and a plurality of terminal electrodes formed on side faces of the multilayer body. The multilayer body has a first capacitor portion and a second capacitor portion. The first capacitor portion includes first and second internal electrodes as the internal electrodes. The second capacitor portion includes third and fourth internal electrodes as the internal electrodes. Each of the first to fourth internal electrodes is electrically connected through a lead conductor or through lead conductors to one or more corresponding terminal electrodes among the first to fourth terminal electrodes. The first and second capacitor portions have their respective capacitances different from each other.

6 Claims, 9 Drawing Sheets

MULTILAYER CAPACITOR

BACKGROUND OF THE INVENTION

1. Field of the Invention

The present invention relates to a multilayer capacitor.

2. Related Background Art

An example of the known multilayer capacitors of this type is one having a multilayer body in which a plurality of dielectric layers and a plurality of internal electrodes are alternately laminated, and a plurality of terminal electrodes formed on the multilayer body (e.g., reference is made to Patent Document 1).

Incidentally, a multilayer capacitor to be connected to a power-supply circuit or the like of an electronic device in order to remove noise is demanded to demonstrate the effect of removing noise in a wide frequency band. In order to effectively remove noise in a wide frequency band, the multilayer capacitor of this type is required to have low impedance over the wide band.

Patent Document 1 discloses a multilayer capacitor in which two capacitors with different capacitances obtained by division of internal electrodes are integrally formed. This multilayer capacitor achieves the low impedance in the wide band, based on the integral formation of the two capacitors with different capacitances.

[Patent Document 1] Japanese Patent Application Laid-Open No. 07-142285

SUMMARY OF THE INVENTION

With the recent trend toward increase in frequency of the power-supply circuit used in electronic devices, there are needs for further reduction in the equivalent series inductance (ESL) of the multilayer capacitor applied to the power-supply circuit. However, the multilayer capacitor described in Patent Document 1 includes no effective countermeasures for suppressing increase of the equivalent series inductance. For this reason, the multilayer capacitor described in Patent Document 1 can suffer increase in the equivalent series inductance. If the equivalent series inductance is high, it could be difficult to sufficiently reduce the impedance.

The present invention has been accomplished in order to solve the above problem and an object of the invention is to provide a multilayer capacitor achieving reduction of the equivalent series inductance and having low impedance over a wide band.

In order to achieve the above object, a multilayer capacitor according to the present invention is a multilayer capacitor comprising a multilayer body in which a plurality of dielectric layers and a plurality of internal electrodes are alternately laminated, and a plurality of terminal electrodes formed on side faces of the multilayer body, wherein the multilayer body has a first capacitor portion including a plurality of first internal electrodes and a plurality of second internal electrodes alternately arranged, as the plurality of internal electrodes, and a second capacitor portion including a third internal electrode and a fourth internal electrode as the plurality of internal electrodes, wherein the plurality of terminal electrodes include a plurality of first and second terminal electrodes electrically insulated from each other, and a third terminal electrode and a fourth terminal electrode electrically insulated from each other, wherein on the side face of the multilayer body where the plurality of first and second terminal electrodes are formed, the plurality of first and second terminal electrodes are alternately arranged, wherein each of the first internal electrodes is electrically connected through a lead conductor to a first terminal electrode selected from among all the first terminal electrodes, and each of the first terminal electrodes is electrically connected to at least one of the first internal electrodes, wherein each of the second internal electrodes is electrically connected through a lead conductor to a second terminal electrode selected from among all the second terminal electrodes and each of the second terminal electrodes is electrically connected to at least one of the second internal electrodes, wherein the third internal electrode is electrically connected through a lead conductor to the third terminal electrode, wherein the fourth internal electrode is electrically connected through a lead conductor to the fourth terminal electrode, wherein the third internal electrode and the fourth internal electrode are arranged so as to be adjacent to each other in a laminating direction of the multilayer body, and wherein a capacitance of the first capacitor portion is different from a capacitance of the second capacitor portion.

Another multilayer capacitor according to the present invention is a multilayer capacitor comprising a multilayer body in which a plurality of dielectric layers and a plurality of internal electrodes are alternately laminated, and a plurality of terminal electrodes formed on side faces of the multilayer body, wherein the multilayer body has a first capacitor portion including a first internal electrode and a second internal electrode as the plurality of internal electrodes, and a second capacitor portion including a third internal electrode and a fourth internal electrode as the plurality of internal electrodes, wherein the plurality of terminal electrodes include a plurality of first and second terminal electrodes electrically insulated from each other, and a third terminal electrode and a fourth terminal electrode electrically insulated from each other, wherein on the side face of the multilayer body where the plurality of first and second terminal electrodes are formed, the plurality of first and second terminal electrodes are alternately arranged, wherein the first internal electrode is electrically connected through a plurality of lead conductors to the respective first terminal electrodes, wherein the second internal electrode is electrically connected through a plurality of lead conductors to the respective second terminal electrodes, wherein the third internal electrode is electrically connected through a lead conductor to the third terminal electrode, wherein the fourth internal electrode is electrically connected through a lead conductor to the fourth terminal electrode, wherein the third internal electrode and the fourth internal electrode are arranged so as to be adjacent to each other in a laminating direction of the multilayer body, and wherein a capacitance of the first capacitor portion is different from a capacitance of the second capacitor portion.

These multilayer capacitors have two resonance frequencies because they have the first and second capacitor portions with the different capacitances. As a result, these multilayer capacitors can achieve low impedance over a wide frequency band. The first and second internal electrodes are connected through the lead conductor(s) to the first and second terminal electrodes, respectively. Since the first and second terminal electrodes are alternately arranged on the side face of the multilayer body, an electric current flowing in the lead conductor connecting the first internal electrode to the first terminal electrode flows in the opposite direction to an electric current flowing in the lead conductor connecting the second internal electrode to the second terminal electrode. For this reason, magnetic fields generated by these electric currents cancel each other, so that the equivalent series inductance is reduced in the multilayer capacitors. In these multilayer capacitors, as described above, the equivalent series inductance is reduced and the low impedance can be achieved over a wide band.

The capacitance of the second capacitor portion is preferably smaller than the capacitance of the first capacitor portion. In this case, the second capacitor portion achieves low impedance in a high frequency band.

Preferably, the second capacitor portion includes a plurality of third and fourth internal electrodes, and the plurality of third internal electrodes and the plurality of fourth internal electrodes are alternately arranged. When the second capacitor portion has the plurality of third and fourth internal electrodes and the configuration in which they are alternately arranged, the capacitance of the second capacitor portion can be varied. As a result, it becomes feasible to make the second capacitor portion function to achieve low impedance in a desired frequency band.

The present invention successfully provides the multilayer capacitor achieving the reduction of the equivalent series inductance and the low impedance over the wide band.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description identical elements or elements with identical functionality will be denoted by the same reference symbols, without redundant description. In the description the terms "above" and "below" will be used, and correspond to vertical relations in each drawing.

First Embodiment

Figure 1:
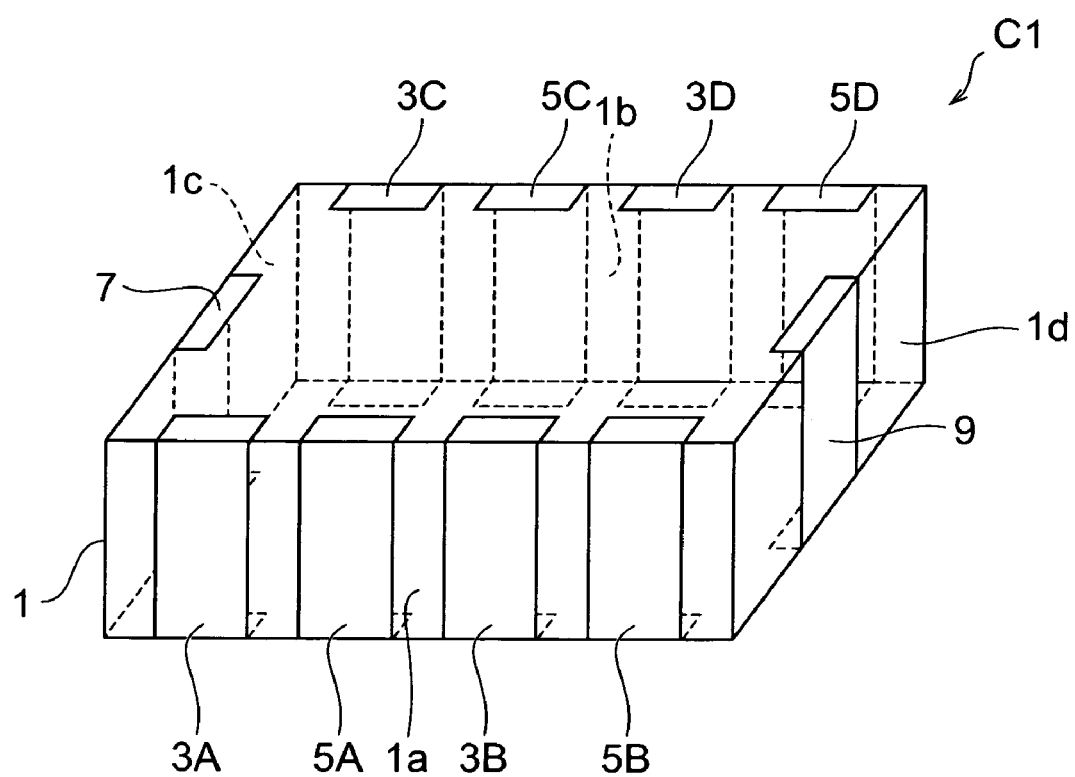
FIG. 1 is a perspective view of a multilayer capacitor according to the first embodiment.
Figure 2:
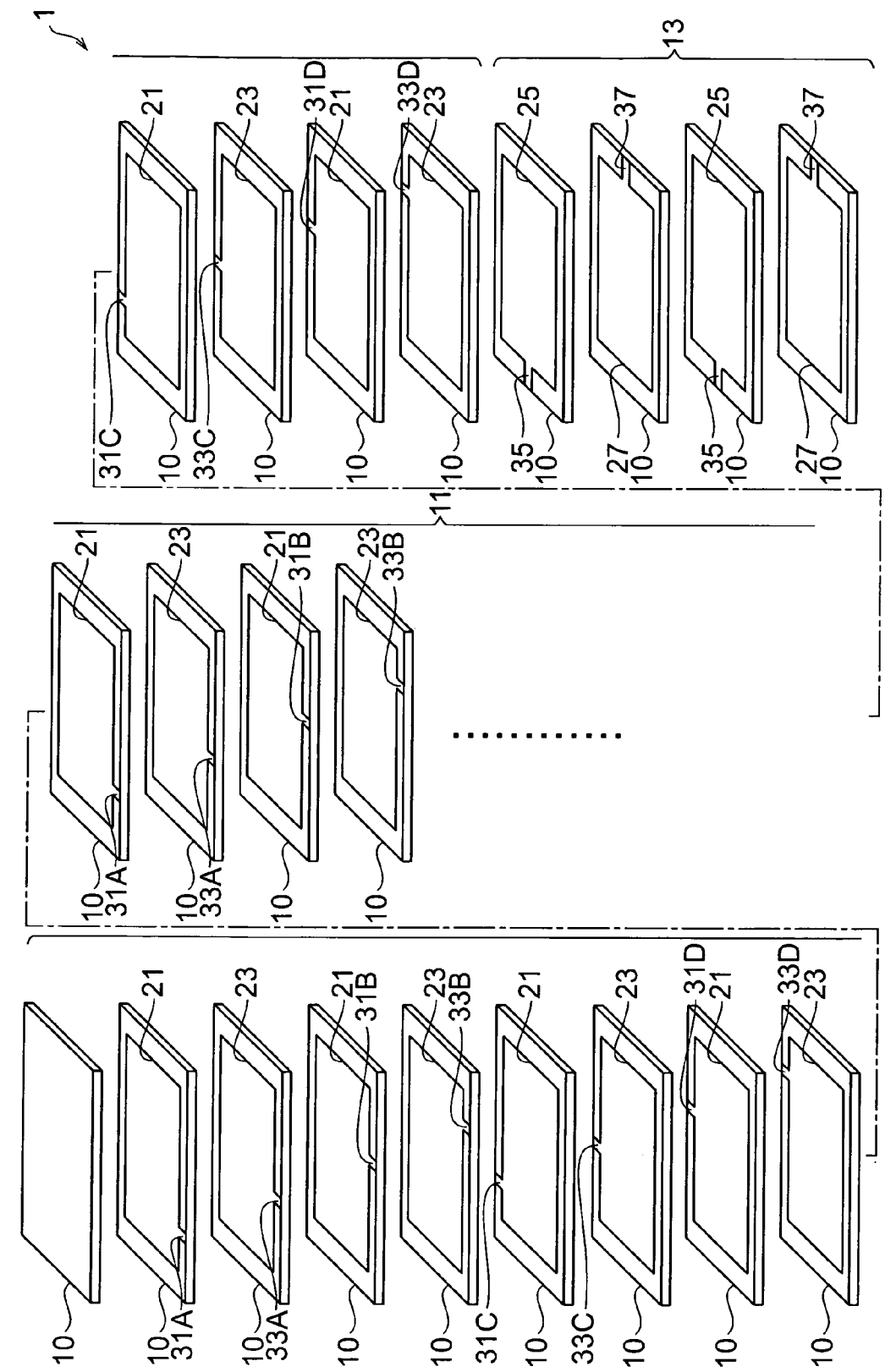
FIG. 2 is an exploded perspective view of a multilayer body included in the multilayer capacitor according to the first embodiment.

A configuration of multilayer capacitor C1 according to the first embodiment will be described with reference to FIGS. 1 and 2. FIG. 1 is a perspective view of the multilayer capacitor according to the first embodiment. FIG. 2 is an exploded perspective view of a multilayer body in the multilayer capacitor according to the first embodiment.

The multilayer capacitor C1, as shown in FIG. 1, is composed of a multilayer body 1 of nearly rectangular parallelepiped shape, and first to fourth terminal electrodes 3A-3D, 5A-5D, 7, and 9 formed on the multilayer body 1. The first and second terminal electrodes 3A-3D, 5A-5D are formed on mutually opposed side faces 1$a$, 1$b$ of the multilayer body 1. The third and fourth terminal electrodes 7, 9 are formed on mutually opposed side faces 1$c$, 1$d$ of the multilayer body 1.

The first terminal electrodes 3A, 3B are formed on the side face 1$a$ of the multilayer body 1. The first terminal electrodes 3C, 3D are formed on the side face 1$b$ of the multilayer body 1 opposed to the side face 1$a$. The second terminal electrodes 5A, 5B are formed on the side face 1$a$ of the multilayer body 1. The second terminal electrodes 5C, 5D are formed on the side face 1$b$ of the multilayer body 1 opposed to the side face 1$a$.

The first and second terminal electrodes 3A-3D, 5A-5D are alternately arranged on the side faces 1$a$, 1$b$. Namely, on the side face 1$a$ there are the first terminal electrode 3A, the second terminal electrode 5A, the first terminal electrode 3B, and the second terminal electrode 5B arranged in the order named, from the side face 1$c$ side toward the side face 1$d$ side. On the side face 1$b$ there are the first terminal electrode 3C, the second terminal electrode 5C, the first terminal electrode 3D, and the second terminal electrode 5D arranged in the order named, from the side face 1$c$ side toward the side face 1$d$ side. The first terminal electrodes 3A-3D and the second terminal electrodes 5A-5D are electrically insulated from each other.

The third terminal electrode 7 is formed on the side face 1$c$ of the multilayer body 1. The fourth terminal electrode 9 is formed on the side face 1$d$ of the multilayer body 1 opposed to the side face 1$c$. The third terminal electrode 7 and the fourth terminal electrode 9 are electrically insulated from each other.

The multilayer body 1, as shown in FIG. 2, has a first capacitor portion 11 and a second capacitor portion 13. The multilayer body 1 is integrally formed by laminating the first capacitor portion 11 and the second capacitor portion 13.

First, a configuration of the first capacitor portion 11 will be described. The first capacitor portion 11 includes a plurality of dielectric layers 10 (e.g., 101 layers), and a plurality of first and second internal electrodes 21, 23 (e.g., 50 layers each) alternately arranged with dielectric layer 10 in between. The first and second internal electrodes 21, 23 are laminated along a direction in which the first and second capacitor portions 11, 13 are laminated (which will be referred to hereinafter as a laminating direction). In the actual multilayer capacitor C1, the layers are integrally formed so that no boundary can be visually recognized between the dielectric layers 10.

Each first internal electrode 21, as shown in FIG. 2, is of rectangular shape. Each first internal electrode 21 is located with a predetermined space from each side face $1a$-$1d$ of the multilayer body 1 parallel to the laminating direction. Each dielectric layer 10 is also of rectangular shape, as shown in FIG. 2.

A lead conductor 31A-31D is formed for each of the first internal electrodes 21. The lead conductors 31A, 31B extend from the first internal electrode 21 so as to be drawn out to the side face $1a$ of the multilayer body 1. The lead conductors 31C, 31D extend from the first internal electrode 21 so as to be drawn out to the side face $1b$ of the multilayer body 1.

Each first internal electrode 21 is electrically connected through a lead conductor 31A-31D to the first terminal electrode selected from among all the first terminal electrodes 3A-3D. Each of the four first terminal electrodes 3A-3D is electrically connected to at least one of the first internal electrodes 21.

Specifically, a first internal electrode 21 with a lead conductor 31A is electrically connected through this lead conductor 31A to the first terminal electrode 3A. A first internal electrode 21 with a lead conductor 31B is electrically connected through this lead conductor 31B to the first terminal electrode 3B. A first internal electrode 21 with a lead conductor 31C is electrically connected through this lead conductor 31C to the first terminal electrode 3C. A first internal electrode 21 with a lead conductor 31D is electrically connected through this lead conductor 31D to the first terminal electrode 3D.

Each second internal electrode 23, as shown in FIG. 2, is of rectangular shape. Each second internal electrode 23 is located with a predetermined space from each side face $1a$-$1d$ of the multilayer body 1 parallel to the laminating direction.

A lead conductor 33A-33D is formed for each of the second internal electrodes 23. The lead conductors 33A, 33B extend from the second internal electrode 23 so as to be drawn out to the side face $1a$ of the multilayer body 1. The lead conductors 33C, 33D extend from the second internal electrode 23 so as to be drawn out to the side face $1b$ of the multilayer body 1.

Each second internal electrode 23 is electrically connected through a lead conductor 33A-33D to the second terminal electrode selected from among all the first terminal electrodes 5A-5D. Each of the four second terminal electrodes 5A-5D is electrically connected to at least one of the second internal electrodes 23.

Specifically, a second internal electrode 23 with a lead conductor 33A is electrically connected through this lead conductor 33A to the second terminal electrode 5A. A second internal electrode 23 with a lead conductor 33B is electrically connected through this lead conductor 33B to the second terminal electrode 5B. A second internal electrode 23 with a lead conductor 33C is electrically connected through this lead conductor 33C to the second terminal electrode 5C. A second internal electrode 23 with a lead conductor 33D is electrically connected through this lead conductor 33D to the second terminal electrode 5D.

Next, a configuration of the second capacitor portion 13 will be described. The second capacitor portion 13 includes a plurality of dielectric layers 10 (e.g., four layers), and a plurality of third and fourth internal electrodes 25, 27 (e.g., two layers each) alternately arranged with dielectric layer 10 in between. The third and fourth internal electrodes 25, 27 are arranged so as to be adjacent to each other in the laminating direction of the multilayer body 1. The laminating number of third and fourth internal electrodes 25, 27 is different from that of first and second internal electrodes 21, 23. Particularly, as exemplified in the present embodiment, it is preferable that the laminating number of third and fourth internal electrodes 25, 27 be smaller than that of first and second internal electrodes 21, 23. In the actual multilayer capacitor C1, the layers are integrally formed so that no boundary can be visually recognized between the dielectric layers 10.

Each third internal electrode 25, as shown in FIG. 2, is of rectangular shape. Each third internal electrode 25 is located with a predetermined space from each side face $1a$-$1d$ of the multilayer body 1 parallel to the laminating direction.

A lead conductor 35 is formed for each of the third internal electrodes 25. Each lead conductor 35 extends from the third internal electrode 25 so as to be drawn out to the side face $1c$ of the multilayer body 1. Each third internal electrode 25 is electrically connected through a lead conductor 35 to the third terminal electrode 7.

Each fourth internal electrode 27, as shown in FIG. 2, is of rectangular shape. Each fourth internal electrode 27 is located with a predetermined space from each side face $1a$-$1d$ of the multilayer body 1 parallel to the laminating direction.

A lead conductor 37 is formed for each of the fourth internal electrodes 27. Each lead conductor 37 extends from the fourth internal electrode 27 so as to be drawn out to the side face $1d$ of the multilayer body 1. Each fourth internal electrode 27 is electrically connected through a lead conductor 37 to the fourth terminal electrode 9.

The first and second internal electrodes 21, 23 in the first capacitor portion 11 are electrically connected to the first and second terminal electrodes 3A-3D, 5A-5D, respectively. On the other hand, the third and fourth internal electrodes 25, 27 in the second capacitor portion 13 are electrically connected to the third and fourth terminal electrodes 7, 9, respectively. Therefore, the first capacitor portion 11 and the second capacitor portion 13 are in a relation in which they are connected in parallel.

Figure 3:
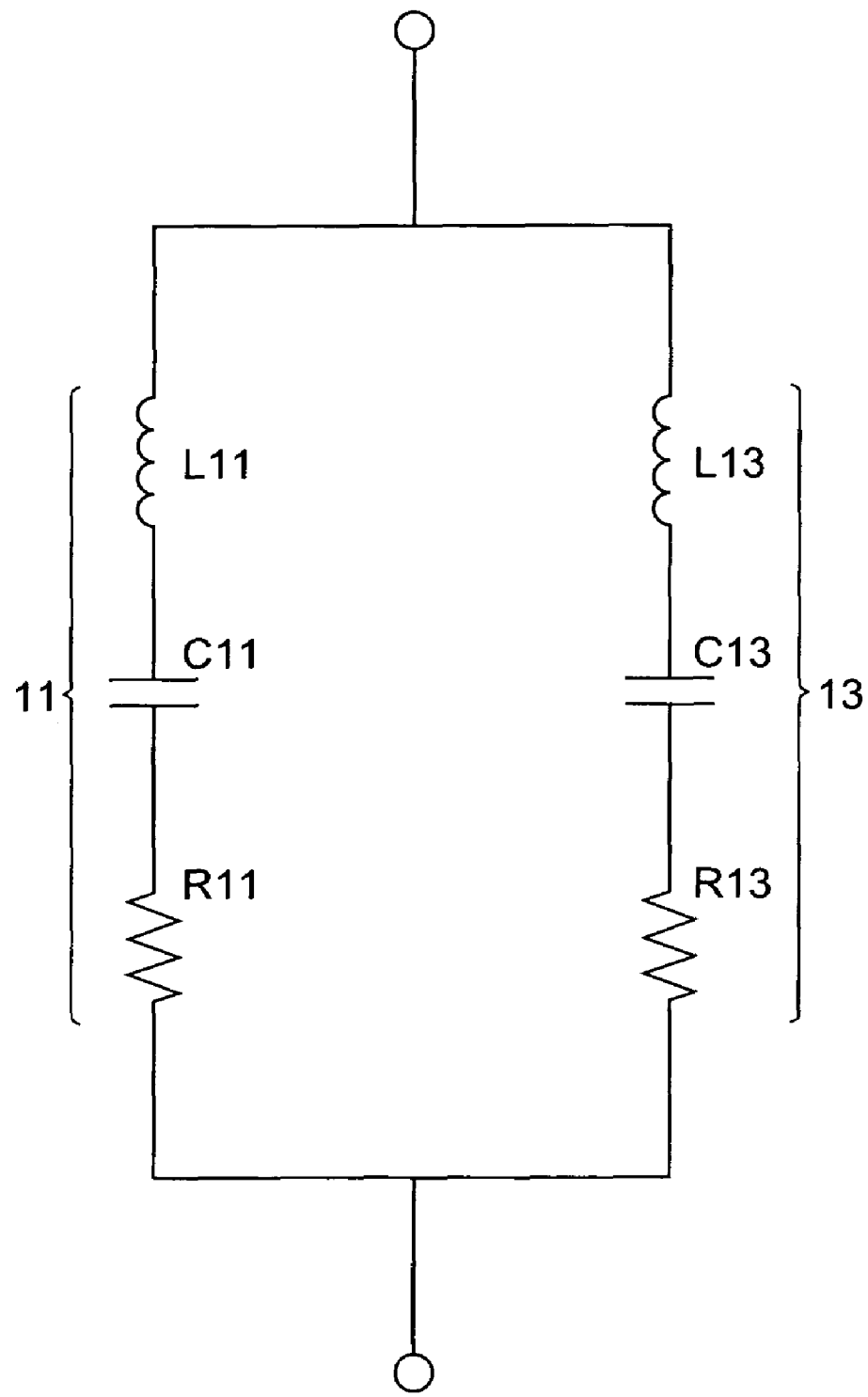
FIG. 3 is an equivalent circuit diagram of the multilayer capacitor according to the first embodiment.

An equivalent circuit diagram of the multilayer capacitor C1 is shown in FIG. 3. The equivalent circuit of the multilayer capacitor C1 is comprised of a parallel circuit of the first capacitor portion 11 and the second capacitor portion 13. In general, a capacitor has a residual inductance and a residual resistance. For this reason, as shown in FIG. 3, the equivalent circuit of the first capacitor portion 11 includes inductance L11 and resistance R12, in addition to capacitance C11. The equivalent circuit of the second capacitor portion 13 includes inductance L13 and resistance R13, in addition to capacitance C13.

The first and second capacitor portions 11, 13 are different in the laminating number of internal electrodes and in the capacitance from each other. Namely, in the multilayer capacitor C1, the laminating number of first and second internal electrodes 21, 23 in the first capacitor portion 11 is larger than that of third and fourth internal electrodes 25, 27 in the second capacitor portion 13. Therefore, the capacitance C11 of the first capacitor portion 11 is larger than the capacitance C13 of the second capacitor portion 13.

Let L be an inductance of a capacitor, and C be a capacitance. Then the resonance frequency f of the capacitor is represented by Eq (1) below. It is understood from Eq (1) that the resonance frequency f1 of the first capacitor portion 11 takes a value different from the resonance frequency f2 of the second capacitor portion 13.

$$f=1/2\pi \cdot \mathrm{sqrt}(L \cdot C) \tag{1}$$

Particularly, where the laminating number of third and fourth internal electrodes 25, 27 in the second capacitor portion 13 is smaller than that of first and second internal electrodes 21, 23 in the first capacitor portion 11, the resonance frequency f2 will be larger than the resonance frequency f1.

Figure 4:
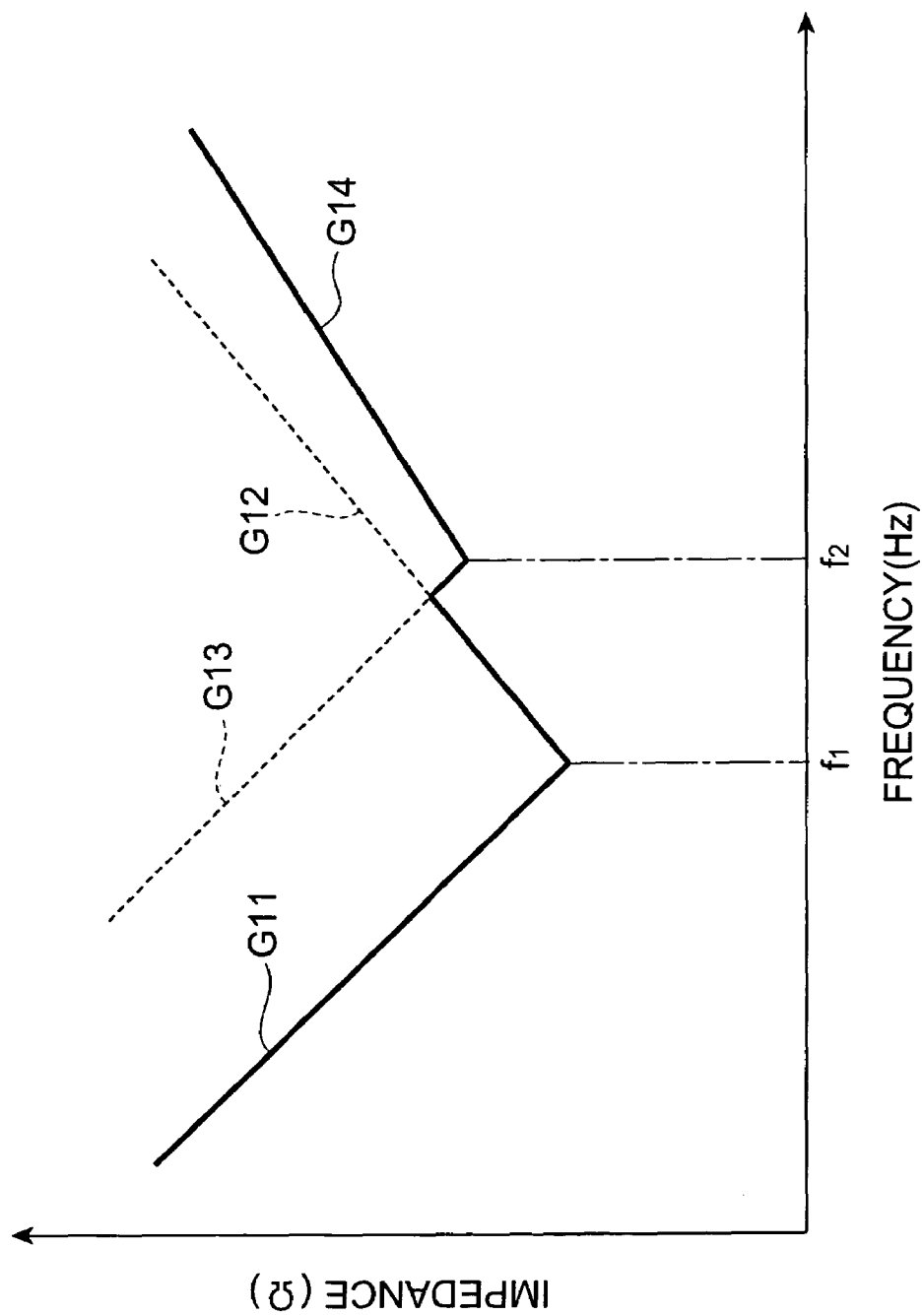
FIG. 4 is a graph showing the impedance characteristics about frequencies of the multilayer capacitor according to the first embodiment.

FIG. 4 is a graph showing the impedance characteristics about frequencies of multilayer capacitor C1. In the graph shown in FIG. 4, the horizontal axis indicates the frequency (Hz) and the vertical axis the impedance ($\Omega$). The impedance characteristic of the first capacitor portion 11 alone with the larger capacitance is represented by graphs G11, G12 and has a minimum point of impedance at the resonance frequency f1 only. The impedance characteristic of the second capacitor portion 13 alone with the capacitance smaller than that of the first capacitor portion 11 is represented by graphs G13, G14 and has a minimum point of impedance at the resonance frequency f2 only. On the other hand, the impedance characteristic of the multilayer capacitor C1 in which the first and second capacitor portions 11, 13 with the different capacitances are connected in parallel is represented by graphs G11, G14 and has minimum points of impedance at the both resonance frequencies f1, f2. Since the multilayer capacitor C1 has the first and second capacitor portions 11, 13 with the different capacitances, as described above, the impedance can be kept lower over the wide frequency band, as compared with capacitors with a single capacitance.

Particularly, in the multilayer capacitor C1, the capacitance C13 of the second capacitor portion 13 is smaller than the capacitance C11 of the first capacitor portion 11. For this reason, the resonance frequency f2 of the second capacitor portion 13 is larger than the resonance frequency f1 of the first capacitor portion 11. Therefore, the second capacitor portion 13 bears the function of reducing the impedance in the high frequency band in which the impedance characteristic cannot be improved by only the first capacitor portion 11. As a result, the multilayer capacitor C1 can decrease the impedance in the high frequency band as well.

The first and second internal electrodes 21, 23 are connected through the respective lead conductors 31A-31D, 33A-33D to the first and second terminal electrodes 3A-3D, 5A-5D. The first and second terminal electrodes 3A-3D, 5A-5D are alternately arranged on the side faces 1a, 1b of the multilayer body 1. For this reason, the lead conductors 31A-31D for connecting the first internal electrodes 21 to the first terminal electrodes 3A-3D and the lead conductors 33A-33D for connecting the second internal electrodes 23 to the second terminal electrodes 5A-5D are alternately arranged in the direction from the side face 1c toward the side face 1d of the multilayer body 1. A direction of electric currents flowing in the lead conductors 31A-31D is opposite to a direction of electric currents flowing in the lead conductors 33A-33D. Therefore, magnetic fields generated by the electric currents flowing in the lead conductors 31A-31D, and magnetic fields generated by the electric currents flowing in the lead conductors 33A-33D cancel each other. This results in reducing the equivalent series inductance of the multilayer capacitor C1.

As described above, the multilayer capacitor C1 achieves the reduction of impedance over the wide band, while reducing the equivalent series inductance.

In the multilayer capacitor C1, the capacitance of the second capacitor portion 13 can be varied by the laminating number of third and fourth internal electrodes 25, 27 alternately arranged. As a result, the second capacitor portion 13 can have a desired resonance frequency in the high frequency band.

Second Embodiment

Figure 5:
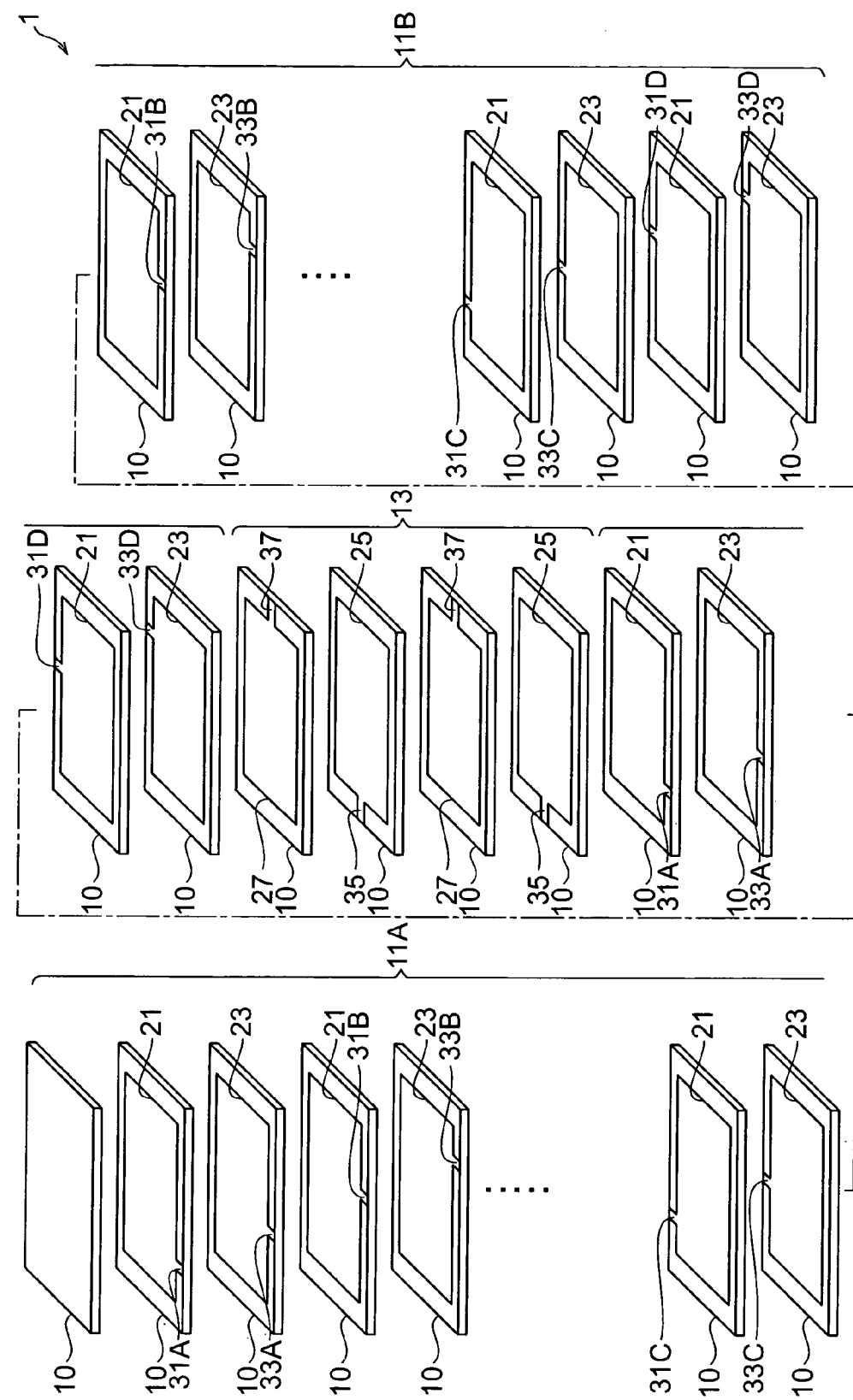
FIG. 5 is an exploded perspective view of a multilayer body included in a multilayer capacitor according to the second embodiment.

A configuration of a multilayer capacitor according to the second embodiment will be described with reference to FIG. 5. The multilayer capacitor of the second embodiment is different from the multilayer capacitor C1 of the first embodiment in that the second capacitor portion 13 is located between divisions of first capacitor portion 11A, 11B. FIG. 5 is an exploded perspective view of a multilayer body in the multilayer capacitor of the second embodiment.

The multilayer body 1 in the multilayer capacitor of the second embodiment has first capacitor portion 11A, 11B and second capacitor portion 13. The second capacitor portion 13 is laid so as to be located between divisions of first capacitor portion 11A, 11B, and these capacitor portions 11A, 11B, 13 are integrally laminated to form the multilayer body 1.

A configuration of the first capacitor portion 11A, 11B will be described. Since the second capacitor portion 13 is located between the divisions of the first capacitor portion, the divisions of first capacitor portion 11A, 11B are located above and below the second capacitor portion 13. For this reason, the configuration of the first capacitor portion will be described with a distinction between the first capacitor division 11A located above the second capacitor portion 13 and the first capacitor division 11B located below the second capacitor portion 13, for convenience' sake.

The first capacitor division 11A includes a plurality of dielectric layers 10 (e.g., 51 layers), and a plurality of first and second internal electrodes 21, 23 (e.g., 25 layers each) alternately arranged with dielectric layer 10 in between. The first and second internal electrodes 21, 23 are laminated along a direction in which the first and second capacitor portions 11A, 11B, 13 are laminated (which will be referred to hereinafter as a laminating direction).

The first capacitor division 11B includes a plurality of dielectric layers 10 (e.g., 50 layers), and a plurality of first and second internal electrodes 21, 23 (e.g., 25 layers each) alternately arranged with dielectric layer 10 in between. The first and second internal electrodes 21, 23 are laminated along the laminating direction. In the actual multilayer capacitor of the second embodiment, the layers are integrally formed so that no boundary can be visually recognized between the dielectric layers 10.

In the multilayer capacitor of the second embodiment, the first capacitor portion 11A, 11B and the second capacitor portion 13 are in a relation in which they are connected in parallel. Since the laminating number of first and second internal electrodes 21, 23 is different from the laminating number of third and fourth internal electrodes 25, 27, the capacitance C11 of the first capacitor portion 11A, 11B is different from the capacitance C13 of the second capacitor portion 13. For this reason, the multilayer capacitor of the second embodiment can also achieve the low impedance over the wide frequency band as the multilayer capacitor C1 of the first embodiment achieved.

Particularly, in the multilayer capacitor of the second embodiment, as exemplified, the laminating number of third and fourth internal electrodes 25, 27 is smaller than the laminating number of first and second internal electrodes 21, 23. For this reason, the capacitance C13 of the second capacitor portion 13 becomes smaller than the capacitance C11 of the first capacitor portion 11A, 11B. Therefore, the second capacitor portion 13 bears the function of reducing the impedance in the high frequency band where the impedance characteristic cannot be improved by the first capacitor portion 11A, 11B only. As a result, the multilayer capacitor of the second embodiment can achieve the reduction of impedance in the high frequency band as well.

The multilayer capacitor of the second embodiment has the plurality of first and second terminal electrodes 3A-3D, 5A-5D, and these are alternately arranged on the side faces 1a, 1b of the multilayer body 1. For this reason, lead conductors 31A-31D, 33A-33D for connecting the first and second internal electrodes 21, 23 to the first and second terminal electrodes 3A-3D, 5A-5D, respectively, are alternately arranged in the direction from the side face 1c toward the side face 1d of the multilayer body 1. Therefore, magnetic fields generated by electric currents flowing in the lead conductors 31A-31D, and magnetic fields generated by electric currents flowing in the lead conductors 33A-33D cancel each other, so as to reduce the equivalent series inductance of the multilayer capacitor according to the second embodiment.

As described above, the multilayer capacitor of the second embodiment can achieve the low impedance over the wide band, while reducing the equivalent series inductance.

In the multilayer capacitor of the second embodiment, the capacitance of the second capacitor portion 13 can be varied by the laminating number of third and fourth internal electrodes 25, 27 alternately arranged. As a result, the second capacitor portion 13 can have a desired resonance frequency in the high frequency band.

The laminating order of the third and fourth internal electrodes 25, 27 in the second capacitor portion 13 may be, for example, the order of third internal electrode 25 and fourth internal electrode 27 as in the multilayer capacitor C1 of the first embodiment, or the order of fourth internal electrode 27 and third internal electrode 25 as in the second embodiment.

Third Embodiment

Figure 6:
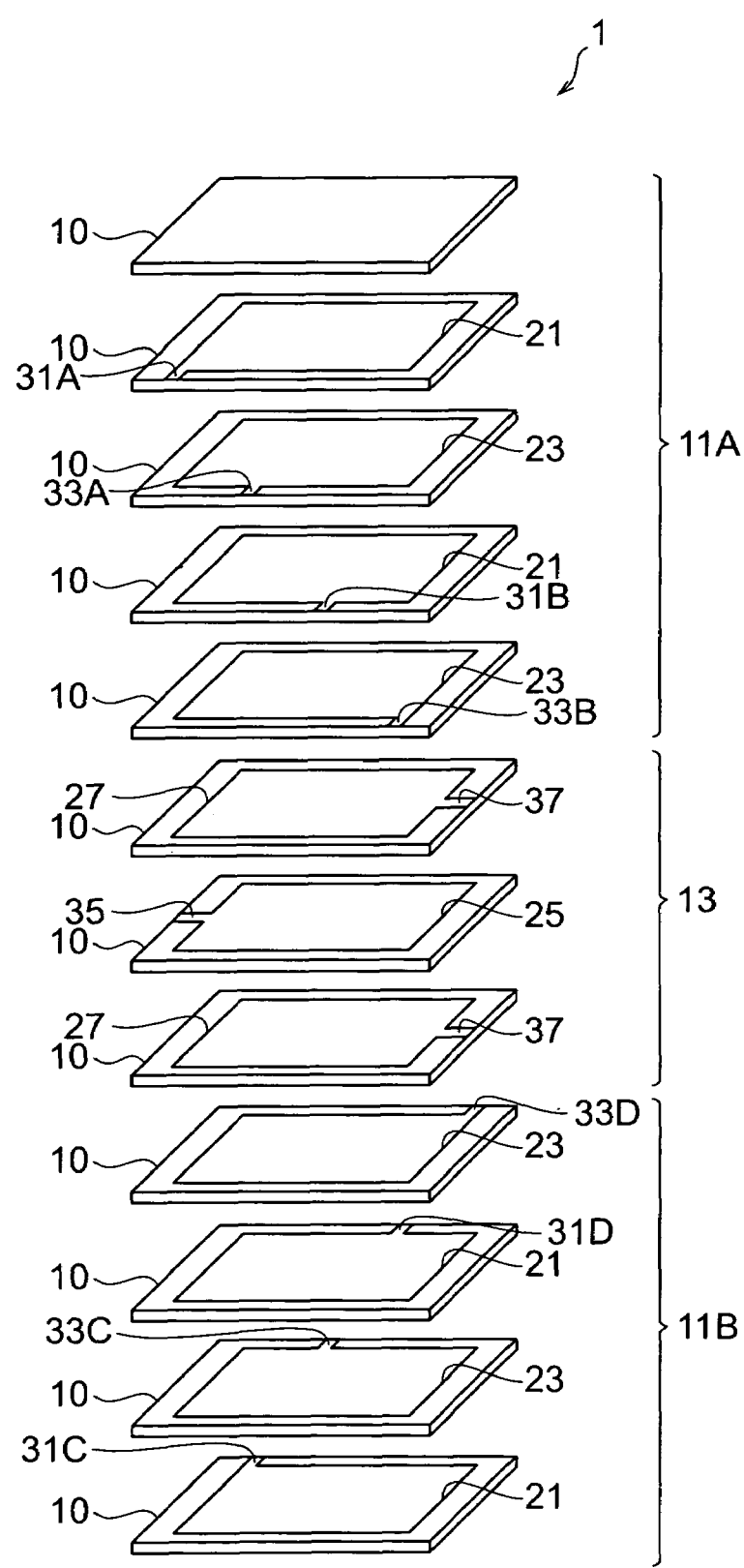
FIG. 6 is an exploded perspective view of a multilayer body included in a multilayer capacitor according to the third embodiment.

A configuration of a multilayer capacitor according to the third embodiment will be described with reference to FIG. 6. The multilayer capacitor of the third embodiment is different from the multilayer capacitor of the second embodiment in that the laminating number of third internal electrodes 25 is different from the laminating number of fourth internal electrodes 27 in the second capacitor portion 13. FIG. 6 is an exploded perspective view of a multilayer body in the multilayer capacitor of the third embodiment.

The first capacitor division 11A includes a plurality of dielectric layers 10 (e.g., 5 layers), and a plurality of first and second internal electrodes 21, 23 (e.g., 2 layers each) alternately arranged with dielectric layer 10 in between. The first and second internal electrodes 21, 23 are laminated along a direction in which the first and second capacitor portions 11A, 11B, 13 are laminated (which will be referred to hereinafter as a laminating direction).

The first capacitor division 11B includes a plurality of dielectric layers 10 (e.g., 4 layers), and a plurality of first and second internal electrodes 21, 23 (e.g., 2 layers each) alternately arranged with dielectric layer 10 in between. The first and second internal electrodes 21, 23 are laminated along the laminating direction. In the actual multilayer capacitor of the second embodiment, the layers are integrally formed so that no boundary can be visually recognized between the dielectric layers 10.

A configuration of the second capacitor portion 13 will be described. The second capacitor portion 13 includes a plurality of dielectric layers 10 (e.g., 3 layers), and third and fourth internal electrodes 25, 27 alternately arranged with dielectric layer 10 in between. The third and fourth internal electrodes 25, 27 are arranged so as to be adjacent to each other in the laminating direction of the multilayer body 1. For example, there is one layer of third internal electrode 25. The number of fourth internal electrode 27 is different from that of third internal electrode 25 (e.g., there are two layers of fourth internal electrodes 27). The third and fourth internal electrodes 25, 27 are laminated along the laminating direction. In the actual multilayer capacitor of the third embodiment, the layers are integrally formed so that no boundary can be visually recognized between the dielectric layers 10.

In the multilayer capacitor of the third embodiment, the first capacitor portion 11A, 11B and the second capacitor portion 13 are in a relation in which they are connected in parallel. Since the laminating number of first and second internal electrodes 21, 23 is different from the laminating number of third and fourth internal electrodes 25, 27, the capacitance C11 of the first capacitor portion 11A, 11B is different from the capacitance C13 of the second capacitor portion 13. For this reason, the multilayer capacitor of the third embodiment can achieve the low impedance over the wide frequency band as the multilayer capacitor C1 of the first embodiment did.

Particularly, in the multilayer capacitor of the third embodiment, as exemplified, the laminating number of third and fourth internal electrodes 25, 27 is smaller than the laminating number of first and second internal electrodes 21, 23. For this reason, the capacitance C13 of the second capacitor portion 13 becomes smaller than the capacitance C11 of the first capacitor portion 11A, 11B. Therefore, the second capacitor portion 13 bears the function of reducing the impedance in the high frequency band where the impedance characteristic cannot be improved by the first capacitor portion 11 only. As a result, the multilayer capacitor of the third embodiment can achieve the reduction of impedance in the high frequency band as well.

The multilayer capacitor of the third embodiment has a plurality of first and second terminal electrodes 3A-3D, 5A-5D, and these terminal electrodes are alternately arranged on the side faces 1a, 1b of the multilayer body 1. For this reason, the lead conductors 31A-31D, 33A-33D for connecting the first and second internal electrodes 21, 23 to the first and second terminal electrodes 3A-3D, 5A-5D, respectively, are alternately arranged in the direction from the side face 1c toward the side face 1d of the multilayer body 1. Therefore, magnetic fields generated by electric currents flowing in the lead conductors 31A-31D, and magnetic fields generated by electric currents flowing in the lead conductors 33A-33D cancel each other, so as to reduce the equivalent series inductance of the multilayer capacitor of the third embodiment.

As described above, the multilayer capacitor of the third embodiment can achieve the low impedance over the wide band, while reducing the equivalent series inductance.

In the multilayer capacitor of the third embodiment, the capacitance of the second capacitor portion 13 can be varied by the laminating number of third and fourth internal electrodes 25, 27 alternately arranged. As a result, the second capacitor portion 13 can have a desired resonance frequency in the high frequency band.

As in the multilayer capacitor of the third embodiment, the laminating number of third internal electrodes 25 and the laminating number of fourth internal electrodes 27 in the second capacitor portion 13 do not always have to be an equal number.

Fourth Embodiment

Figure 7:
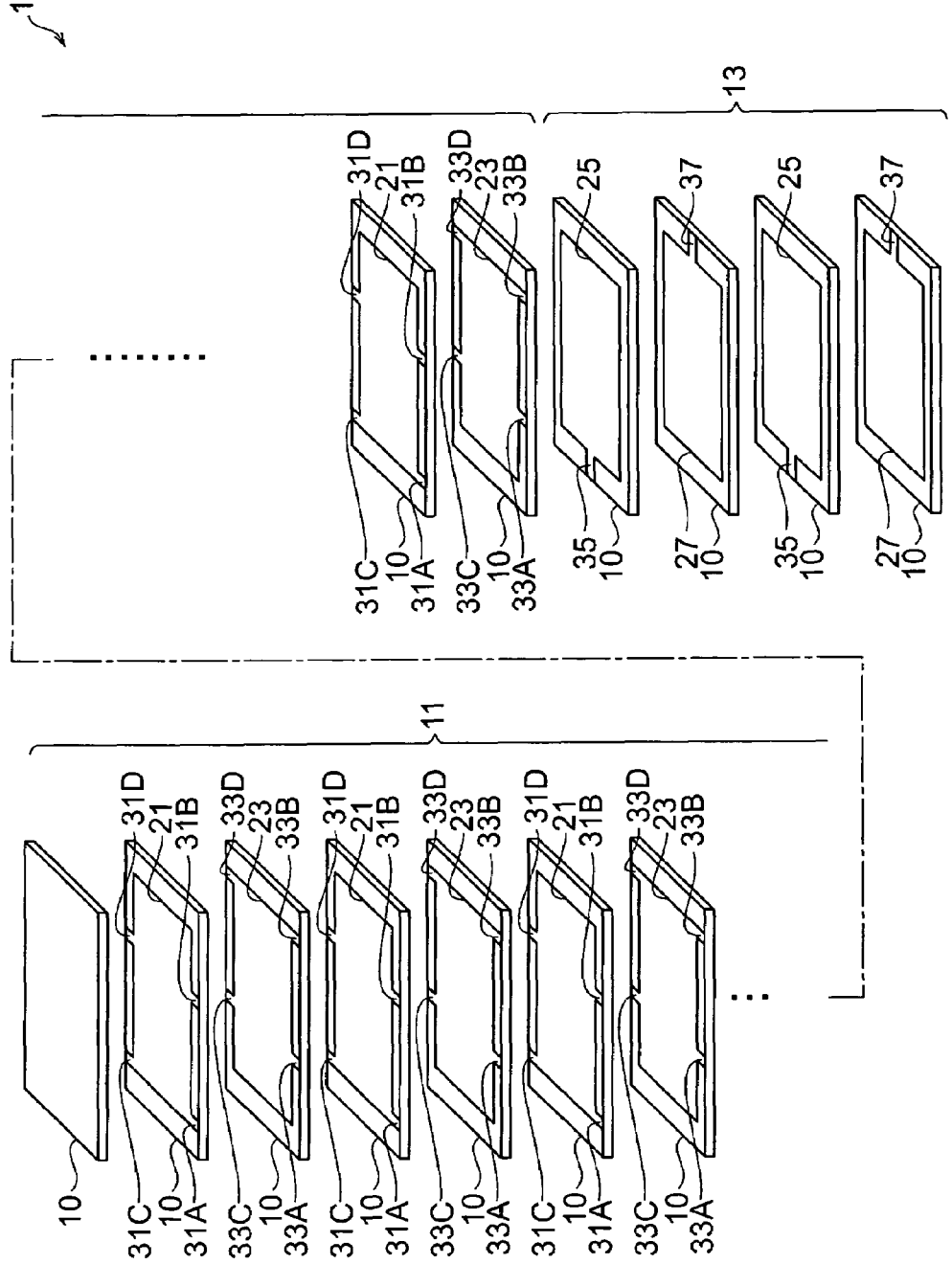
FIG. 7 is an exploded perspective view of a multilayer body included in a multilayer capacitor according to the fourth embodiment.

A configuration of a multilayer capacitor according to the fourth embodiment will be described with reference to FIG. 7. The multilayer capacitor of the fourth embodiment is different in the number of first and second terminal electrodes to which each of first and second internal electrodes is electrically connected, from the multilayer capacitor C1 of the first embodiment. FIG. 7 is an exploded perspective view of a multilayer body in the multilayer capacitor of the fourth embodiment.

The multilayer body 1, as shown in FIG. 7, has a first capacitor portion 11 and a second capacitor portion 13. The multilayer body 1 is integrally formed by laminating first capacitor portion 11 and second capacitor portion 13.

First, a configuration of the first capacitor portion 11 will be described. The first capacitor portion 11 includes a plurality of dielectric layers 10 (e.g., 101 layers), and a plurality of first and second internal electrodes 21, 23 (e.g., 50 layers each) alternately arranged with dielectric layer 10 in between. The first and second internal electrodes 21, 23 are laminated along a direction in which the first and second capacitor portions 11, 13 are laminated (which will be referred to hereinafter as a laminating direction). In the actual multilayer capacitor of the fourth embodiment, the layers are integrally formed so that no boundary can be visually recognized between the dielectric layers 10.

Each first internal electrode 21, as shown in FIG. 7, is of rectangular shape. Each first internal electrode 21 is located with a predetermined space from each side face 1a-1d of the multilayer body 1 parallel to the laminating direction. Each dielectric layer 10, as shown in FIG. 7, is also of rectangular shape.

Four lead conductors 31A-31D are formed for each of the first internal electrodes 21. The lead conductors 31A, 31B extend from first internal electrode 21 so as to be drawn out to the side face 1a of the multilayer body 1. The lead conductors 31C, 31D extend from first internal electrode 21 so as to be drawn out to the side face 1b of the multilayer body 1.

Each first internal electrode 21 is electrically connected through four lead conductors 31A-31D to four first terminal electrodes 3A-3D, respectively. Namely, a first internal electrode 21 is electrically connected through lead conductor 31A to first terminal electrode 3A, through lead conductor 31B to first terminal electrode 3B, through lead conductor 31C to first terminal electrode 3C, and through lead conductor 31D to first terminal electrode 3D.

Each second internal electrode 23, as shown in FIG. 7, is of rectangular shape. Each second internal electrode 23 is located with a predetermined space from each side face 1a-1d of the multilayer body 1 parallel to the laminating direction.

Four lead conductors 33A-33D are formed for each of the second internal electrodes 23. The lead conductors 33A, 33B extend from the second internal electrode 23 so as to be drawn out to the side face 1a of the multilayer body 1. The lead conductors 33C, 33D extend from the second internal electrode 23 so as to be drawn out to the side face 1b of the multilayer body 1.

Each second internal electrode 23 is electrically connected through four lead conductors 33A-33D to four second terminal electrodes 5A-5D, respectively. Namely, a second internal electrode 23 is electrically connected through lead conductor 33A to second terminal electrode 5A, through lead conductor 33B to second terminal electrode 5B, through lead conductor 33C to second terminal electrode 5C, and through lead conductor 33D to second terminal electrode 5D.

In the multilayer capacitor of the fourth embodiment, the first capacitor portion 11 and the second capacitor portion 13 are in a relation in which they are connected in parallel. Since the laminating number of first and second internal electrodes 21, 23 is different from that of third and fourth internal electrodes 25, 27. The capacitance C11 of the first capacitor portion 11 is different from the capacitance C13 of the second capacitor portion 13. For this reason, the multilayer capacitor of the fourth embodiment can achieve the low impedance over the wide frequency band as the multilayer capacitor C1 of the first embodiment did.

Particularly, in the multilayer capacitor of the fourth embodiment, as exemplified, the laminating number of third and fourth internal electrodes 25, 27 is smaller than the laminating number of first and second internal electrodes 21, 23. For this reason, the capacitance C13 of the second capacitor portion 13 is smaller than the capacitance C11 of the first capacitor portion 11. Therefore, the second capacitor portion 13 bears the function of reducing the impedance in the high frequency band where the impedance characteristic cannot be improved by the first capacitor portion 11 only. As a result, the multilayer capacitor of the fourth embodiment can achieve the reduction of impedance in the high frequency band as well.

The multilayer capacitor of the fourth embodiment has the plurality of first and second terminal electrodes 3A-3D, 5A-5D, and these are alternately arranged on the side faces 1a, 1b of the multilayer body 1. For this reason, the lead conductors 31A-31D, 33A-33D for connecting the first and second internal electrodes 21, 23 to the first and second terminal electrodes 3A-3D, 5A-5D, respectively, are alternately arranged in the direction from the side face 1c toward the side face 1d of the multilayer body 1. Therefore, magnetic fields generated by electric currents flowing in the lead conductors 31A-31D, and magnetic fields generated by electric currents flowing in the lead conductors 33A-33D cancel each other, so as to reduce the equivalent series inductance of the multilayer capacitor of the fourth embodiment.

As described above, the multilayer capacitor of the fourth embodiment can achieve the low impedance over the wide band, while reducing the equivalent series inductance.

In the multilayer capacitor of the fourth embodiment, the capacitance C13 of the second capacitor portion 13 can be varied by the laminating number of third and fourth internal electrodes 25, 27 alternately arranged. As a result, the second capacitor portion 13 can have a desired resonance frequency in the high frequency band.

Fifth Embodiment

Figure 8:
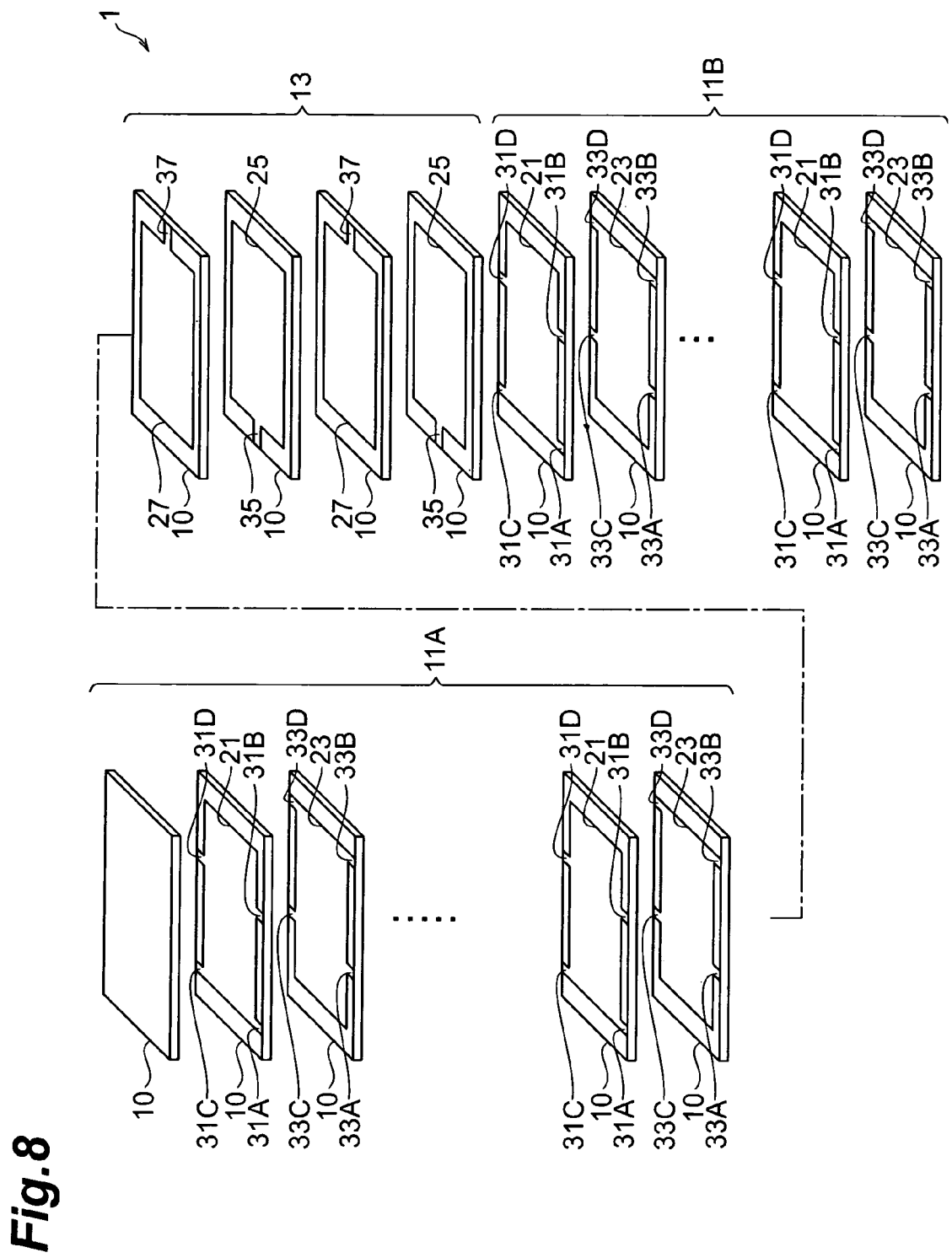
FIG. 8 is an exploded perspective view of a multilayer body included in a multilayer capacitor according to the fifth embodiment.

A configuration of a multilayer capacitor according to the fifth embodiment will be described with reference to FIG. 8. The multilayer capacitor of the fifth embodiment is different from the multilayer capacitor of the fourth embodiment in that the second capacitor portion 13 is located between divisions of first capacitor portion 11A, 11B. FIG. 8 is an exploded perspective view of a multilayer body in the multilayer capacitor of the fifth embodiment.

The multilayer body 1 in the multilayer capacitor of the fifth embodiment has first capacitor portion 11A, 11B and second capacitor portion 13. These capacitor portions 11A, 11B, 13 are integrally laminated to form the multilayer body 1 so that the second capacitor portion 13 is located between the divisions of first capacitor portion 11A, 11B.

A configuration of the first capacitor portion 11A, 11B will be described. Since the second capacitor portion 13 is located between the divisions of the first capacitor portion, the divisions of first capacitor portion 11A, 11B are located above and below the second capacitor portion 13. For this reason, the configuration of the first capacitor portion will be described with a distinction between the first capacitor division 11A located above the second capacitor portion 13 and the first capacitor division 11B located below the second capacitor portion 13, for convenience' sake.

The first capacitor division 11A includes a plurality of dielectric layers 10 (e.g., 51 layers), and a plurality of first and second internal electrodes 21, 23 (e.g., 25 layers each) alternately arranged with dielectric layer 10 in between. The first and second internal electrodes 21, 23 are laminated along a direction in which the first and second capacitor portions 11A, 11B, 13 are laminated (which will be referred to hereinafter as a laminating direction).

The first capacitor division 11B includes a plurality of dielectric layers 10 (e.g., 50 layers), and a plurality of first and second internal electrodes 21, 23 (e.g., 25 layers each) alternately arranged with dielectric layer 10 in between. The first and second internal electrodes 21, 23 are laminated along the laminating direction. In the actual multilayer capacitor of the fifth embodiment, the layers are integrally formed so that no boundary can be visually recognized between the dielectric layers 10.

In the multilayer capacitor of the fifth embodiment, the first capacitor portion 11A, 11B and the second capacitor portion 13 are in a relation in which they are connected in parallel. Since the laminating number of first and second internal electrodes 21, 23 is different from the laminating number of third and fourth internal electrodes 25, 27, the capacitance C11 of the first capacitor portion 11A, 11B is different from the capacitance C13 of the second capacitor portion 13. For this reason, the multilayer capacitor of the fifth embodiment can achieve the low impedance over the wide frequency band as the multilayer capacitor C1 of the first embodiment did.

Particularly, in the multilayer capacitor of the fifth embodiment, as exemplified, the laminating number of third and fourth internal electrodes 25, 27 is smaller than the laminating number of first and second internal electrodes 21, 23. For this reason, the capacitance C13 of the second capacitor portion 13 is smaller than the capacitance C11 of the first capacitor portion 11A, 11B. Therefore, the second capacitor portion 13 bears the function of reducing the impedance in the high frequency band where the impedance characteristic cannot be improved by the first capacitor portion 11 only. As a result, the multilayer capacitor of the fifth embodiment can achieve the reduction of impedance in the high frequency band as well.

The multilayer capacitor of the fifth embodiment has a plurality of first and second terminal electrodes 3A-3D, 5A-5D, and these are alternately arranged on the side faces 1a, 1b of the multilayer body 1. For this reason, the lead conductors 31A-31D, 33A-33D for connecting the first and second internal electrodes 21, 23 to the first and second terminal electrodes 3A-3D, 5A-5D, respectively, are alternately arranged in the direction from the side face 1c to the side face 1d of the multilayer body 1. Therefore, magnetic fields generated by electric currents flowing in the lead conductors 31A-31D, and magnetic fields generated by electric currents flowing in the lead conductors 33A-33D cancel each other, so as to reduce the equivalent series inductance of the multilayer capacitor of the fifth embodiment.

As described above, the multilayer capacitor of the fifth embodiment can achieve the low impedance over the wide band, while reducing the equivalent series inductance.

In the multilayer capacitor of the fifth embodiment, the capacitance of the second capacitor portion 13 can be varied by the laminating number of third and fourth internal electrodes 25, 27 alternately arranged. As a result, the second capacitor portion 13 can have a desired resonance frequency in the high frequency band.

The laminating order of the third and fourth internal electrodes 25, 27 in the second capacitor portion 13 may be, for example, the order of third internal electrode 25 and fourth internal electrode 27 as in the multilayer capacitor C1 of the first embodiment, or the order of fourth internal electrode 27 and third internal electrode 25 as in the fifth embodiment.

Sixth Embodiment

Figure 9:
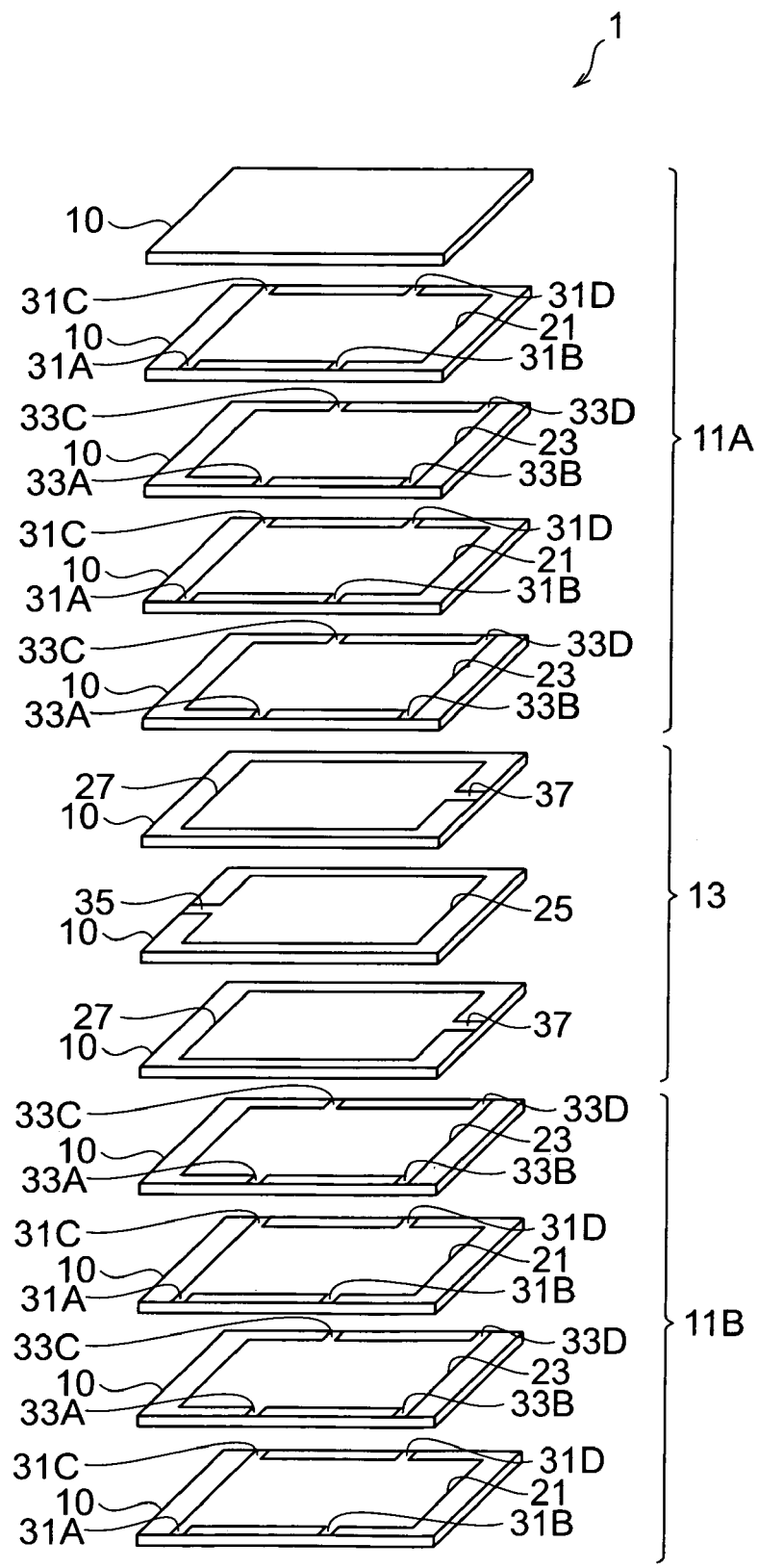
FIG. 9 is an exploded perspective view of a multilayer body included in a multilayer capacitor according to the sixth embodiment.

A configuration of a multilayer capacitor according to the sixth embodiment will be described with reference to FIG. 9. The multilayer capacitor of the sixth embodiment is different from the multilayer capacitor of the fifth embodiment in that the laminating number of third internal electrodes 25 is different from the laminating number of fourth internal electrodes 27 in the second capacitor portion 13. FIG. 9 is an exploded perspective view of a multilayer body in the multilayer capacitor of the sixth embodiment.

The first capacitor division 11A includes a plurality of dielectric layers 10 (e.g., 5 layers), and a plurality of first and second internal electrodes 21, 23 (e.g., 2 layers each) alternately arranged with dielectric layer 10 in between. The first and second internal electrodes 21, 23 are laminated along a direction in which the first and second capacitor portions 11A, 11B, 13 are laminated (which will be referred to hereinafter as a laminating direction).

The first capacitor portion 11B includes a plurality of dielectric layers 10 (e.g., 4 layers), and a plurality of first and second internal electrodes 21, 23 (e.g., 2 layers each) alternately arranged with dielectric layer 10 in between. The first and second internal electrodes 21, 23 are laminated along the laminating direction. In the actual multilayer capacitor of the second embodiment, the layers are integrally formed so that no boundary can be visually recognized between the dielectric layers 10.

A configuration of the second capacitor portion 13 will be described. The second capacitor portion 13 includes a plurality of dielectric layers 10 (e.g., 3 layers), and third and fourth internal electrodes 25, 27 alternately arranged with dielectric layer 10 in between. The third and fourth internal electrodes 25, 27 are arranged so as to be adjacent to each other in the laminating direction of the multilayer body 1. For example, there is one layer of third internal electrode 25. The number of fourth internal electrodes 27 is different from the number of third internal electrodes 25 (e.g., there are two layers of fourth internal electrodes 27). The third and fourth internal electrodes 25, 27 are laminated along the laminating direction. In the actual multilayer capacitor of the sixth embodiment, the layers are integrally formed so that no boundary can be visually recognized between the dielectric layers 10.

In the multilayer capacitor of the sixth embodiment, the first capacitor portion 11A, 11B and the second capacitor portion 13 are in a relation in which they are connected in parallel. Since the laminating number of first and second internal electrodes 21, 23 is different from the laminating number of third and fourth internal electrodes 25, 27, the capacitance C11 of the first capacitor portion 11A, 11B is different from the capacitance C13 of the second capacitor portion 13. For this reason, the multilayer capacitor of the sixth embodiment can achieve the low impedance over the wide frequency band as the multilayer capacitor C1 of the first embodiment did.

Particularly, in the multilayer capacitor of the sixth embodiment, as exemplified, the laminating number of third and fourth internal electrodes 25, 27 is smaller than the laminating number of first and second internal electrodes 21, 23. For this reason, the capacitance C13 of the second capacitor portion 13 is smaller than the capacitance C11 established by the entire portion of the first capacitor divisions 11A, 11B. Therefore, the second capacitor portion 13 bears the function of reducing the impedance in the high frequency band where the impedance characteristic cannot be improved by the first capacitor portion 11 only. As a result, the multilayer capacitor of the sixth embodiment can reduce the impedance in the high frequency band as well.

The multilayer capacitor of the sixth embodiment has a plurality of first and second terminal electrodes 3A-3D, 5A-5D, and these are alternately arranged on the side faces 1a, 1b of the multilayer body 1. For this reason, the lead conductors 31A-31D, 33A-33D for connecting the first and second internal electrodes 21, 23 to the first and second terminal electrodes 3A-3D, 5A-5D, respectively, are alternately arranged in the direction from the side face 1c to the side face 1d of the multilayer body 1. Therefore, magnetic fields generated by electric currents flowing in the lead conductors 31A-31D, and magnetic fields generated by electric currents flowing in the lead conductors 33A-33D cancel each other, so as to reduce the equivalent series inductance of the multilayer capacitor of the sixth embodiment.

As described above, the multilayer capacitor of the sixth embodiment can achieve the low impedance over the wide band, while reducing the equivalent series inductance.

In the multilayer capacitor of the sixth embodiment, the capacitance of the second capacitor portion 13 can be varied by the laminating number of third and fourth internal electrodes 25, 27 alternately arranged. As a result, the second capacitor portion 13 can have a desired resonance frequency in the high frequency band.

The laminating number of third internal electrodes 25 and the laminating number of fourth internal electrodes 27 in the second capacitor portion 13 do not always have to be an equal number, as in the multilayer capacitor of the sixth embodiment.

The preferred embodiments of the present invention were described above in detail, but the present invention is by no means intended to be limited to the above embodiments and modifications. For example, the laminating number of dielectric layers 10, the laminating number of first and second internal electrodes 21, 23, and the laminating number of third and fourth internal electrodes 25, 27 are not limited to the numbers described in the above-described embodiments. The numbers of terminal electrodes 3A-3D, 5A-5D, 7, 9 are not limited to the numbers described in the above embodiments, either. The number of first and second terminal electrodes can be two or more, and the number of third and fourth terminal electrodes can be one or more. In addition, the locations of the first capacitor portion 11, 11A, 11B, and the second capacitor portion 13 in the laminating direction are not limited to the locations described in the above embodiments. The number of first internal electrodes 21 and the number of second internal electrodes 23 in the first capacitor portion 11, 11A, 11B do not always have to be equal to each other. The number of third internal electrodes 25 and the number of fourth internal electrodes 27 in the second capacitor portion 13 do not always have to be equal to each other.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of internal electrodes are alternately laminated, and a plurality of terminal electrodes formed on side faces of the multilayer body, wherein the multilayer body has a first capacitor portion including a plurality of first internal electrodes and a plurality of second internal electrodes alternately arranged, as the plurality of internal electrodes, and a second capacitor portion including a third internal electrode and a fourth internal electrode as the plurality of internal electrodes, wherein the plurality of terminal electrodes include a plurality of first and second terminal electrodes electrically insulated from each other, and a third terminal electrode and a fourth terminal electrode electrically insulated from each other, wherein on the side face of the multilayer body where the plurality of first and second terminal electrodes are formed, the plurality of first and second terminal electrodes are alternately arranged, wherein each of the first internal electrodes is electrically connected through a lead conductor to a first terminal electrode selected from among all the first terminal electrodes, and each of the first terminal electrodes is electrically connected to at least one of the first internal electrodes, wherein each of the second internal electrodes is electrically connected through a lead conductor to a second terminal electrode selected from among all the second terminal electrodes and each of the second terminal electrodes is electrically connected to at least one of the second internal electrodes, wherein the third internal electrode is electrically connected through a lead conductor to the third terminal electrode, wherein the fourth internal electrode is electrically connected through a lead conductor to the fourth terminal electrode, wherein the third internal electrode and the fourth internal electrode are arranged so as to be adjacent to each other in a laminating direction of the multilayer body, and wherein a capacitance of the first capacitor portion is different from a capacitance of the second capacitor portion.

2. The multilayer capacitor according to claim 1, wherein the capacitance of the second capacitor portion is smaller than the capacitance of the first capacitor portion.

3. The multilayer capacitor according to claim 1, wherein the second capacitor portion includes a plurality of said third and fourth internal electrodes, and
wherein the plurality of third internal electrodes and the plurality of fourth internal electrodes are alternately arranged.

4. A multilayer capacitor comprising a multilayer body in which a plurality of dielectric layers and a plurality of internal electrodes are alternately laminated, and a plurality of terminal electrodes formed on side faces of the multilayer body,
wherein the multilayer body has a first capacitor portion including a first internal electrode and a second internal electrode as the plurality of internal electrodes, and a second capacitor portion including a third internal electrode and a fourth internal electrode as the plurality of internal electrodes,
wherein the plurality of terminal electrodes include a plurality of first and second terminal electrodes electrically insulated from each other, and a third terminal electrode and a fourth terminal electrode electrically insulated from each other,
wherein on the side face of the multilayer body where the plurality of first and second terminal electrodes are formed, the plurality of first and second terminal electrodes are alternately arranged,
wherein the first internal electrode is electrically connected through a plurality of lead conductors to the respective first terminal electrodes,
wherein the second internal electrode is electrically connected through a plurality of lead conductors to the respective second terminal electrodes,
wherein the third internal electrode is electrically connected through a lead conductor to the third terminal electrode,
wherein the fourth internal electrode is electrically connected through a lead conductor to the fourth terminal electrode,
wherein the third internal electrode and the fourth internal electrode are arranged so as to be adjacent to each other in a laminating direction of the multilayer body, and
wherein a capacitance of the first capacitor portion is different from a capacitance of the second capacitor portion.

5. The multilayer capacitor according to claim 4, wherein the capacitance of the second capacitor portion is smaller than the capacitance of the first capacitor portion.

6. The multilayer capacitor according to claim 4, wherein the second capacitor portion includes a plurality of said third and fourth internal electrodes, and
wherein the plurality of third internal electrodes and the plurality of fourth internal electrodes are alternately arranged.

* * * * *